United States Patent
Hohnholz et al.

(10) Patent No.: US 10,370,559 B2
(45) Date of Patent: Aug. 6, 2019

(54) TWO-COMPONENT COATING COMPOSITIONS AND HIGH EROSION RESISTANCE COATINGS PRODUCED THEREFROM

(71) Applicant: BASF Coatings GmbH, Muenster (DE)

(72) Inventors: Dieter Hohnholz, Gross Ippener (DE); Oliver Boelke, Cloppenburg (DE); Julia Krupp, Oldenburg (DE)

(73) Assignee: BASF Coatings GmbH, Muenster (DE)

( * ) Notice: Subject to any disclaimer, the term of this patent is extended or adjusted under 35 U.S.C. 154(b) by 317 days.

(21) Appl. No.: 15/118,328

(22) PCT Filed: Dec. 22, 2014

(86) PCT No.: PCT/EP2014/079031
§ 371 (c)(1),
(2) Date: Aug. 11, 2016

(87) PCT Pub. No.: WO2015/120941
PCT Pub. Date: Aug. 20, 2015

(65) Prior Publication Data
US 2017/0174933 A1    Jun. 22, 2017

(30) Foreign Application Priority Data
Feb. 13, 2014  (EP) .................................. 14154945

(51) Int. Cl.
| | | |
|---|---|---|
| C09D 167/04 | (2006.01) |
| C08G 18/66 | (2006.01) |
| C08G 18/72 | (2006.01) |
| C08G 18/73 | (2006.01) |
| C08G 18/75 | (2006.01) |
| C08G 18/79 | (2006.01) |
| C08G 18/10 | (2006.01) |
| C09D 175/06 | (2006.01) |
| C08G 18/38 | (2006.01) |
| C08G 18/42 | (2006.01) |
| C08G 18/44 | (2006.01) |
| C08G 18/12 | (2006.01) |
| C08G 18/40 | (2006.01) |
| C08G 18/62 | (2006.01) |

(52) U.S. Cl.
CPC .......... *C09D 167/04* (2013.01); *C08G 18/10* (2013.01); *C08G 18/12* (2013.01); *C08G 18/3821* (2013.01); *C08G 18/4063* (2013.01); *C08G 18/42* (2013.01); *C08G 18/4277* (2013.01); *C08G 18/44* (2013.01); *C08G 18/6229* (2013.01); *C08G 18/6651* (2013.01); *C08G 18/721* (2013.01); *C08G 18/73* (2013.01); *C08G 18/755* (2013.01); *C08G 18/792* (2013.01); *C09D 175/06* (2013.01)

(58) Field of Classification Search
CPC ...... C09D 167/04; C08G 18/10; C08G 18/12; C08G 18/6651; C08G 18/721; C08G 18/73; C08G 18/792; C08G 18/3821; C08G 18/42; C08G 18/755; C08D 175/06
See application file for complete search history.

(56) References Cited

U.S. PATENT DOCUMENTS

| | | |
|---|---|---|
| 6,350,823 B1 | 2/2002 | Goeb et al. |
| 2002/0016421 A1 | 2/2002 | Goeb et al. |
| 2005/0059791 A1 | 3/2005 | Roesler et al. |
| 2011/0076485 A1 | 3/2011 | Yakulis, Jr. et al. |
| 2011/0294934 A1 | 12/2011 | Wamprecht et al. |
| 2013/0172475 A1 | 7/2013 | Zhang et al. |
| 2013/0253091 A1 | 9/2013 | Wagner |

FOREIGN PATENT DOCUMENTS

| | | |
|---|---|---|
| CN | 1616513 A | 5/2005 |
| CN | 102031057 A | 4/2011 |
| WO | 00/20481 A1 | 4/2000 |
| WO | 2010/122157 A1 | 10/2010 |
| WO | 2012/032113 A1 | 3/2012 |
| WO | 2012/069414 A1 | 5/2012 |

OTHER PUBLICATIONS

Silanes | Organofunctional. Wacher Chemie AG. (Year: 2013).*
International Search Report dated Jan. 26, 2015 in PCT/EP2014/079031, filed Dec. 22, 2014.

* cited by examiner

*Primary Examiner* — John E Uselding
(74) *Attorney, Agent, or Firm* — Oblon, McClelland, Maier & Neustadt, L.L.P.

(57) ABSTRACT

The present invention relates to a two-component coating composition comprising (1) a paint base component comprising (A) at least one polycarbonate diol, (B) at least one polyaspartic ester, and (C) at least one filler modified with at least one organosilane, and (2) a hardener component comprising (D) at least one hexamethylene diisocyanate isocyanurate containing aliphatic polyester groups and having an isocyanate content of 5% to 23%. The present invention also relates to a method for producing a coating using the coating composition, and to the coatings produced accordingly.

15 Claims, No Drawings

TWO-COMPONENT COATING COMPOSITIONS AND HIGH EROSION RESISTANCE COATINGS PRODUCED THEREFROM

The present invention relates to two-component coating compositions and to coatings produced from them. The present invention also relates to a method for producing these coatings, and to the use of the coating composition for producing coatings. The present invention relates not least to the use of the coating compositions for improving erosion resistance.

PRIOR ART

In various areas of application there is a requirement for coatings which satisfy exacting mechanical requirements. Examples here include surfaces of objects that in terms of the ambient conditions are exposed to high speeds in conjunction with exposure to erosive substances, such as solids or liquids. Erosive exposure is experienced in principle, therefore, by objects which, firstly, themselves are moved, and, secondly, by objects exposed to the influence of erosive substances. Particularly noteworthy are rotor blades of wind turbines or helicopters and ship's screws, air and land vehicles (such as aircraft, rail vehicles, automobiles, for example), and ships.

Fundamentally, erosion can be brought about by liquid or solid substances which are present themselves or dispersely or in solution in another gaseous or liquid medium (for example, air or water) and which are moved by that medium (for example, airborne sand, rain and/or hail). When these substances impinge on objects or their surfaces, they exert an erosive force on them. Examples of this are the erosion due to rain or airborne sand on rotor blades or in the region of the slats on aircraft. The erosive influences are particularly strong in the region of edges of the objects in question.

In general terms the possibility exists of controlling wear protection, more particularly the erosion resistance, of objects by means of coatings on the surfaces of the objects. Important factors in obtaining effective erosion resistance are known to include a closely matched balance between flexibility or elasticity of the coating, on the one hand, and the hardness of the coating, on the other. Excessive hardness and/or inadequate elasticity tend to be detrimental to effective erosion resistance.

One possibility for increasing erosion resistance is to increase the film thickness of coatings. In many applications, however, such as in aircraft construction or rotor blade construction of wind turbines, for example, this is undesirable, for reasons of weight.

Furthermore, resins with aromatic resin constituents, such as epoxy resins, for example, can be used in the coating compositions on which the coatings are based. On account of the aromatic moieties, however, the resulting coatings, while affording high wear resistance, possess a significantly restricted UV stability.

It is possible, furthermore, to use coating compositions comprising resins with which, induced by light or by temperature, high crosslinking densities can be achieved. For example, UV resins (via radical or ionic polymerization) or certain highly reactive polyaddition resins can be used. With these classes of binder it is likewise possible to enhance the wear resistance, but there are limiting factors governing use on large components such as rotor blades or aircraft components. In the case of formulations comprising UV resins, for example, the selection of pigments is limited, since these pigments may have absorption maxima at curing wavelengths, and the film thicknesses are limited in dependence on the level of pigmentation. Moreover, technical challenges arise in terms of oxygen inhibition of the UV initiators. In the case where temperature-induced coating materials (that is, in particular, common one-component paints) are used, a limitation exists in particular with regard to the baking temperatures in relation to equipment sizing in the case of large components.

An important further property of erosion-resistant coatings, moreover, is their sandability. Sanding, as part of the pretreatment of a coated surface to be repaired, is enormously important, in order to prepare the surface, for example, as a base for the refinish. Especially in the field of coatings subject to severe erosive exposure, effective sandability and hence repairability are very important. In order to have proportionate sandability, however, it is known that a coating must be relatively hard. Consequently, achieving effective sandability for erosion-resistant coatings, which are required to have a comparatively high elasticity or flexibility, represents a major challenge.

International patent application WO 2010/122157 discloses erosion-resistant polyurethane coatings which are produced using aliphatic polyester polyols and an isocyanate component, as for example polylactone-modified isocyanate prepolymers or uretdione compounds.

WO 2012/032113 A1 discloses two-component, erosion-resistant coating compositions based on a polyol component and on a polylactone component terminated by isocyanate groups, these compositions being useful in the production of coatings on rotor blades.

Although the coatings produced accordingly have erosion resistance which is already improved, further improvement is desirable particularly in view of current challenges in, for example, the construction of wind turbine rotor blades, especially for wind-rich sites (offshore) and also in aircraft construction (weight reduction with equal or improved performance).

PROBLEM

The problem addressed by the present invention, therefore, was that of eliminating the above-described disadvantages of the prior art. The intention was to provide coating compositions which can be used for producing erosion-resistant coatings, which exhibit a significantly enhanced erosion resistance compared with erosion-resistant coatings of the prior art. In addition to the desired erosion resistance, the compositions and coatings produced from them ought to offer effective stability in the face of general weathering effects (for example, UV radiation, moisture), in order to be able to be used in particular in the application sectors already described above. These coating compositions ought to be easy to produce and easy to use even with large components such as rotor blades of wind turbines or aircraft—that is, should be amenable to processing to coatings in particular without the use of UV initiators and/or of high temperatures. In spite of the high erosion resistance, the coatings ought nevertheless to feature good sandability.

SOLUTION

Found accordingly has been a two-component coating composition comprising
(1) a paint base component comprising
  (A) at least one polycarbonate diol,
  (B) at least one polyaspartic ester, and
  (C) at least one filler modified with at least one organosilane, and (2) a hardener component comprising (D) at least one hexamethylene diisocyanate isocyanurate containing aliphatic polyester groups and having an isocyanate content of 5% to 23%.

The new two-component coating composition is subject matter of the present invention and is also referred to below as coating composition of the invention. Preferred embodiments will become apparent from the description hereinafter and from the dependent claims.

The present invention also provides a method for producing coatings using the coating composition of the invention, and a coating produced from the coating composition. The invention also provides the use of the coating composition for improving erosion resistance.

The coating composition of the invention is easily processed to coatings. The coatings produced feature, in particular, excellent erosion resistance and outstanding sandability at the same time. The coating composition and the coatings are therefore ideally suited to substrates which are subject to severe erosive influences, examples being rotor blades or substrates in aircraft construction.

DESCRIPTION OF THE INVENTION

The coating composition of the invention is a two-component coating composition. This means, as is known, that for the purposes of the present invention, component (1) as described below (paint base component), and component (2) as described below (hardener component), are prepared and stored separately from one another and are not combined until shortly before application. The processing time or pot life (in other words, the time within which the coating composition of the invention can be processed at room temperature (15 to 25° C., more particularly 20° C.) without the increase in viscosity, as a result of corresponding cross-linking reactions at room temperature, for example, being so severe that application is no longer possible) is dependent, as is known, on the constituents employed, more particularly on the polycarbonate diols (A), polyaspartic esters (B), described later on below, and on the hexamethylene diisocyanate isocyanurate (D). In particular, however, the processing time of the primer is at least 2 min up to 60 min, preferably at least 5 min up to 60 min. The principal advantage of a two-component coating composition of this kind is that even in the case of large components such as rotor blades of wind turbines or aircraft, easy processing is possible—more particularly, no high temperatures are needed for curing. Following application to a substrate, the coating material of the invention is cured preferably at less than 80° C., especially preferably less than 60° C.

By curing is meant the process known to the skilled person, in other words the conversion of a coating composition, applied as a film to a substrate, into the ready-to-use state, in other words, therefore, into a state in which the substrate provided with the coating in question can be transported, stored, and put to its intended use. This curing is accomplished more particularly by chemical reaction of reactive functional groups in the components present, which are present as binder constituents in the coating material. Particularly noteworthy, therefore, in the context of the present invention is the reaction of the hydroxyl groups of the polycarbonate and also of the amino groups of the polyaspartic ester with the isocyanate groups of the hexamethylene diisocyanate isocyanurate (D). As a result of these crosslinking reactions and of the parallel evaporation of any organic solvents and/or water present, a coating film is formed—that is, a cured coating layer (cured coating) is produced. Activation of the reactions is possible by means of thermal energy, although in the present case there is the above-described advantage of high temperatures not being necessary. The term "binder" or "binder constituent" refers herein, in accordance with the relevant DIN EN ISO 4618, to the nonvolatile fraction of a coating material, excluding pigments and fillers. Specific binder constituents are therefore in this sense, as well as components (A) and (B), component (D) as well (which may also be referred to as hardener, curing agent, or crosslinking agent), or else typical coatings additives, and also all other nonvolatile constituents, bar the pigments and fillers. For reasons not least of clarity, however, the term "binder" is used principally in relation to those components of the paint base component (1) that are primarily responsible for film forming—that is, more particularly, components (A) and (B). Component (C) is identified primarily, correspondingly, as the hardener or else crosslinking agent.

The two-component coating composition comprises at least one polycarbonate diol (A) in the paint base component (1).

Considered formally, polycarbonate diols are esterification products which may form through reaction of carbonic acid with polyols. In actual practice, as is known, the carbonate structures are introduced by means of phosgene or carbonic diesters under common reaction conditions. The reaction with diols, as for example with 3-methyl-1,5-pentanediol or 1,6-hexanediol, then gives the polycarbonate diols. Besides the carbonate functions joining the starting components, of course, such polycarbonate diols may also, proportionally, include further functional groups such as ester groups or ether groups, depending on the nature and amount of the starting compounds used. The polycarbonate diol is preferably a linear polycarbonate diol. The hydroxyl groups are preferably terminal, in other words arranged at both ends of the preferably linear polycarbonate diol (hydroxyl-terminated polycarbonate diol). Very preferably the compound is an aliphatic polycarbonate diol. The polycarbonate diol therefore preferably contains no aromatic groups, since these groups have a significantly restricted UV resistance.

The polycarbonate diols (A), more particularly the linear, aliphatic polycarbonate diols, preferably possess an OH number of 50 to 500 mg KOH/g, preferably 80 to 400 mg KOH/g, more particularly 100 to 250 mg KOH/g (measured in accordance with DIN 53240). Any reference in the context of the present invention to an official standard is of course to the version of the standard that is valid on the filing date or, if there is no valid version on that date, to the most recent valid version.

Since the polycarbonates (A) are diolic components, the OH number and the number-average molecular weight of the components are dependent on one another, and the stated OH number gives information on the number-average molecular weight. A high number-average molecular weight tends to be accompanied by a low OH number. The number-average molecular weight may vary widely and is situated in the range from, for example, 220 g/mol to 2250 g/mol (measured by means of GPC analysis with THF (+0.1% acetic acid) as eluent (1 ml/min) on a styrene-divinylbenzene column combination, calibration with polystyrene standards).

Suitable polycarbonate diols (A) are available, for example, in the Desmophen® C product line from Bayer MaterialScience AG (Leverkusen, Germany).

The fraction of the polycarbonates (A) is situated preferably in the range from 5 to 30 wt %, more preferably 8 to 25 wt %, very preferably 10 to 20 wt %, based in each case on the total weight of the coating composition of the invention.

The two-component coating composition comprises at least one polyaspartic ester in the paint base component (1).

Polyaspartic esters are the components that are known to the skilled person in connection, for example, with coating compositions. They are polyamines with secondary amino groups, more particularly with two secondary amino groups. The components can be obtained by preparation methods familiar to the skilled person, as for example by addition of primary, preferably aliphatic diamines onto maleic or fumaric dialkyl esters, or else by addition of primary, preferably aliphatic amines onto unsaturated polyesters. The term "alkyl" (or alkyl radical) encompasses linear, branched, and cyclic alkyl units (or alkyl radicals).

The polyaspartic esters preferably have an amine number of 120 to 300 mg KOH/g, preferably 140 to 260 mg KOH/g. The amine number is determined in accordance with DIN EN ISO 15880.

The polyaspartic esters are preferably aliphatic. They contain, accordingly, preferably no aromatic groups. They are preferably saturated.

Preferred polyaspartic esters are described by the formula (I) below

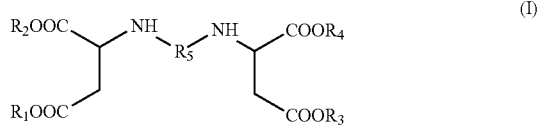

where $R_1$, $R_2$, $R_3$, and $R_4$ independently of one another are alkyl radicals having 1 to 12 carbon atoms, preferably 1 to 4 carbons atoms, and $R_5$ is a divalent alkylene radical having 6 to 24 carbon atoms, preferably 6 to 16 carbon atoms.

In particularly preferred embodiments, the radicals $R_1$, $R_2$, $R_3$ and $R_4$ are ethyl radicals. Particularly preferred alkylene radicals $R_5$ are

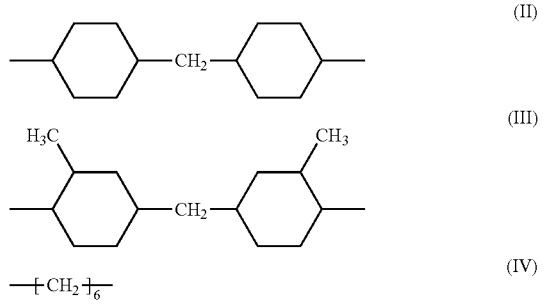

Suitable polyaspartic esters (B) are available, for example, in the Desmophen® NH product line from Bayer MaterialScience AG (Leverkusen, Germany).

The fraction of the polyaspartic esters (B) is situated preferably in the range from 5 to 30 wt %, more preferably 8 to 25 wt %, very preferably 10 to 20 wt %, based in each case on the total weight of the coating composition of the invention.

The two-component coating composition comprises at least one filler (C), modified with at least one organosilane, in the paint base component (1).

Suitable fillers to be modified (i.e., fillers not yet modified with organosilanes) include in principle all the fillers, especially inorganic fillers, known to the skilled person in connection with coating compositions. These are understood to be different substances, used in granular or powder form, for example, which are employed for the purpose of achieving particular physical properties in coating compositions, and which are insoluble in the respective application medium. They include, in particular, inorganic fillers, these being carbonates such as calcium carbonate, dolomite or barium carbonate, sulfates such as calcium sulfate and barium sulfate, silicates, optionally phyllosilicates, such as talc, pyrophyllite, mica, kaolin, feldspar, precipitated calcium, aluminum, calcium/aluminum, and sodium/aluminum silicates, and mullite, wollastonite, and silicon dioxide, especially quartz and cristobalite. In the context of the present invention, silicon dioxides are subordinate to the silicates group. Further inorganic fillers are precipitated silicas or fumed silicas, and also metal oxides such as aluminum hydroxide and magnesium hydroxide.

Preferred inorganic fillers are silicates. Especially preferred is wollastonite. Wollastonite, as is known, is a common designation for calcium metasilicate, and in the naturally occurring wollastonite up to 2 wt % of the calcium ions may have been replaced by magnesium, iron and/or manganese ions.

The filler (C) is a filler modified with organosilanes. Thus the filler to be modified serves as a substrate, onto which the organosilanes are applied. Such coating of fillers may take place under fundamentally known conditions, with physisorption and/or chemisorption of the organosilanes taking place in dependence on the reaction conditions and/or substrate properties. The coating or modifying process may take place, for example, in aqueous solution, optionally in the presence of catalysts such as acids or bases, via hydrolysis and subsequent condensation. A classic example is the hydrolysis of correspondingly hydrolyzable bonds in the organosilane (—Si—OCH$_3$ bond, for example) and the subsequent condensation with hydroxyl groups on the filler surface, as for example the hydroxyl groups on a silicate surface.

Organosilanes are known to the skilled person. They are components derived from pure silanes (that is, binary compounds consisting of Si and H) (derivatives of pure silanes), in which at least a proportion of hydrogen is substituted by an organic radical and this radical is joined via a carbon atom to the silicon. In the context of the present invention, accordingly, compounds are identified as organosilanes when they contain at least one Si—C bond. Suitable organic radicals include, for example, pure alkyl radicals or else alkyl radicals in which at least one hydrogen residue is substituted by a functional group such as an amino group. In harmony with customary definitions, organosilanes are also identified as compounds in which all of the Si-bonded hydrogen residues present in the pure silane are substituted by other radicals, provided there is at least one Si—C bond left. Common radicals by which hydrogen residues are substituted are for example, in addition to the organic radicals described above, hydroxyl groups, alkoxy groups or halogens. Such organosilanes may have monomeric, oligomeric, or else polymeric character (for the definition of oligomeric and polymeric organosilanes, see below).

Preferred organosilanes used for the modification may be described by way of the following general formula (V):

$$X_{4-n-m}Si-R_n(-A-B)_m \qquad (V)$$

where

X=OH, halogen, alkoxy, more particularly methoxy and ethoxy, aryloxy,

R=alkyl, preferably $C_1$ to $C_{12}$ alkyl, phenyl, or H,

A=divalent organic radical, more particularly divalent alkylene radical, preferably $C_1$ to $C_6$ alkylene, more particularly $C_1$ to $C_3$ alkylene, B=amino, hydroxyl, epoxy, epoxypropyloxy, hydroxyalkyl, acetoxy, isocyanate, acryloyloxy, methacryloyloxy, imidazole, ureido, vinyl group, n, m=0, 1, 2, or 3, with n+m≤3, preferably 1≤n+m≤3.

The preferred organosilanes therefore have at least one group X and, as is known, are readily hydrolyzable in aqueous solution, for example, and can be linked via a subsequent condensation to a filler surface which has hydroxyl groups, a silicate surface for example. Preferably X is a methoxy or ethoxy group.

Through a corresponding choice of the substituents, therefore, it is possible for the filler surface to be given an individually adapted modification. As a result of the addition of the organosilanes, the surface of the inorganic fillers is hydrophobized in each case. There may be exclusive modification with silanes which carry alkyl groups (m=0), or modification with functional groups such as amino groups, for example (m>0). It is also possible for mixtures of different silanes to be used—for example, those with only alkyl group functionality (m=0) and those which include, at least proportionally, functional groups such as amino groups (m>0).

Also possible for the modification, as well as or instead of the use of the organosilanes of the formula (V), is the use of other organosilanes, such as organosilanes of higher molecular weight, for example. Such organosilanes may also be referred to as oligomeric or polymeric organosilanes, in which, for example, a plurality of the abovementioned organosilanes of the formula (V) are present condensed with one another via the hydrolyzable groups present, and only then are applied to the surface of the fillers, via further hydrolyzable groups that are still present. Condensation of monomeric silanes with one another as described may, moreover, also occur, of course, for purely statistical reasons, during the process for modifying fillers with the organosilanes of the formula (V). In other words, for example, organosilanes of the formula (V) are used, but then may attach to the filler surface not only in their monomeric starting form, but also, following condensation with one another, in oligomeric or polymeric form. In the context of the present invention, an organosilane is termed oligomeric if it is constructed on average from two to five identical or different monomeric organosilane units (i.e., those containing only one silicon atom). A polymeric organosilane, accordingly, has more than 5 units.

Examples include the following organosilanes: propyltrimethoxysilane, propyltriethoxysilane, iso-butyltrimethoxysilane, n-octyltrimethoxysilane, iso-octyltrimethoxysilane, n-octyltriethoxysilane, n-decyl-trimethoxysilane, dodecyltrimethoxysilane, hexadecyl-trimethoxysilane, vinyltrimethoxysilane, 3-aminopropyl-trimethoxysilane, 3-methacryloyloxytrimethoxysilane, 3-glycidyloxypropyltrimethoxysilane, beta-(3,4-epoxy-cyclohexyl)ethyltrimethoxysilane, gamma-isocyanato-propyltrimethoxysilane, 1,3-bis(3-glycidyloxypropyl)-1,1,3,3-tetramethyldisiloxane, ureidopropyltriethoxy-silane, and their homogeneous and heterogeneous oligomers and polymers. Such silanes are obtainable for example under the trade name Dynasylan or Geniosil.

In the context of the present invention, preference is given to using silanes which contain amino groups, more particularly amino-containing organic radicals which are attached via a carbon atom to silicon.

The particle size of the modified fillers (C) is not itself a critical parameter and is situated, for example, within the ranges common for fillers, from a few micrometers (more particularly, average particle size ($d_{50}$) 0.1 to 100 μm, preferably 1 to 50 μm, measured by means of laser diffraction in accordance with ISO 13320:2009). The amount of the organosilane coatings on such fillers is, for example, between 0.2 and 5 wt %, based on the total weight of the modified filler.

Such fillers (C) may be obtained commercially, as for example under the trade names Tremin, Tremica, or Silbond from the company HPF The Mineral Engineers.

The fraction of the fillers (C) is preferably in the range from 5 to 25 wt %, more preferably 6 to 20 wt %, very preferably 8 to 15 wt %, based in each case on the total weight of the coating composition of the invention.

The two-component coating composition comprises at least one hexamethylene diisocyanate (HDI) isocyanurate (D) containing aliphatic polyester groups and having an isocyanate content of 5% to 23%.

As is known, isocyanurates can be prepared from any of a very wide variety of isocyanates, in the presence of particular catalysts, examples being sodium formate, potassium acetate, tertiary amines, or triphenyl-phosphines. The isocyanurate ring systems which form, consisting of three isocyanate groups in each case, are very stable, retaining their integrity even at high temperatures of more than 100° C., for example. Each of these three isocyanate groups originates from three different molecules of the respective isocyanate used; in other words trimeric structures are formed. If polyisocyanates are used, examples being diisocyanates such as HDI, it is possible for an intermediate crosslinking to occur, and hence a plurality of isocyanurate rings may become linked to one another. It is known also to be possible for fractions of bridging diols, as for example hexanediol, to be added during the preparation of the isocyanurates, in order to modify their reactivity, for example, and in this way for a plurality of isocyanurate ring systems to become joined to one another.

The isocyanurate (D) contains aliphatic polyester groups, being groups which comprise repeating structural units —R—C(=O)—O—C—, where R=divalent aliphatic radical. Preferred aliphatic polyester groups are polylactone groups, more particularly polycapro-lactone groups. Polycaprolactones and their preparation, by reaction of a monoalcohol with epsilon-caprolactone, for example, are known. They may be introduced, for example, by common methods into the isocyanurate, via reaction of an isocyanate group with at least one of the hydroxyl groups they contain.

As a result of the aliphatic polyester groups present and of the intermediate crosslinking, where it occurs, the hexamethylene diisocyanate (HDI) isocyanurates (D) have a lower isocyanate content than, for example, a pure HDI trimer. While the latter has an isocyanate content of about 25% (molecular weight 3×NCO=126 g/mol; molecular weight of the purely trimeric isocyanurate of HDI=504.6 g/mol), the isocyanurate (D) possesses an isocyanate content of 5% to 23%, preferably 6% to 20%, especially preferably 7% to 17%, very preferably 8% to 14%. In the context of the present invention, the isocyanate content is determined in accordance with DIN EN ISO 11909 by reaction of the respective sample with excess dibutylamine and back-titration of the excess with hydrochloric acid against bromophenol blue.

The number-average molecular weight of the hexamethylene diisocyanate isocyanurates (D) may lie within ranges of, for example 600 to 4000 g/mol, preferably 800 to 2000 g/mol.

The hexamethylene diisocyanate (HDI) isocyanurates (D) are at any rate polyisocyanates. This means that they in any case contain on average more than one isocyanate group per molecule, preferably more than two isocyanate groups per molecule, more preferably more than two up to a maximum of three isocyanate groups per molecule. The number of isocyanate groups per molecule is readily determinable via the isocyanate content and the number-average molecular weight of the respective isocyanurate.

Corresponding hexamethylene diisocyanate isocyanurates (D) are available commercially, in solvent-free form or as a solution in conventional solvents as described later on below, for example, and they can readily be used in the coating composition of the invention. Referenced, for example, are commercial products in the Desmodur product line from Bayer, an example being Desmodur N 3800.

The fraction of the at least one hexamethylene diisocyanate isocyanurate (D) is preferably in the range from 20 to 60 wt %, more preferably 25 to 55 wt %, very preferably 30 to 50 wt %, based in each case on the total weight of the coating composition of the invention.

As further constituents, the coating composition of the invention may comprise any of a wide variety of coatings components that are known to the person skilled in the art.

The coating composition may comprise organic solvents and/or water. Organic solvents are aliphatic and/or aromatic hydrocarbons such as toluene, xylene, solvent naphtha, Solvesso 100, or Hydrosol® (from ARAL), ketones, such as acetone, methyl ethyl ketone or methyl amyl ketone, esters, such as ethyl acetate, butyl acetate, butyl glycol acetate, pentyl acetate, methoxypropyl acetate or ethyl ethoxypropionate, ethers, alcohols, chlorinated hydrocarbons, or mixtures of the aforementioned solvents.

It is of particular advantage, however, that the coating material of the invention can be produced in solvent-free form. The components otherwise included permit application to a substrate, as described below, despite the absence of any solvent. In this way, more particularly by avoidance of organic solvents, the coating composition also has a high environmental profile. The expression "solvent-free" is known fundamentally to the skilled person. It is used preferably to mean that the coating composition contains less than 10 wt % of organic solvents. Preferably there are less than 7.5 wt % of organic solvents, especially preferably less than 5 wt % of organic solvents, very preferably less than 2.5 wt % of organic solvents. The figures are based in each case on the total weight of the coating composition. Organic solvents, therefore, are preferably not explicitly added in order, for example, to adapt the viscosity of the composition. They are used, if at all, only in small amounts in the coating composition as a result of the use of—for example—typical coatings additives, which may be optionally obtained commercially in solution in organic solvents. The coating composition also preferably contains no water or only minor amounts of water (water-free). Especially preferably there is less than 5 wt %, preferably less than 2.5 wt %, of water present, based on the total weight of the coating composition. It is therefore preferably used in the composition only, if at all, as a result of the use of —for example—typical coatings additives.

Besides the at least one hexamethylene diisocyanate (HDI) isocyanurate (D) containing aliphatic polyester groups and having an isocyanate content of 5% to 23%, the coating composition of the invention may further comprise at least one additional polyisocyanate different from (D). It is nevertheless preferable for the isocyanurate (D) to be used in a fraction of at least 50 wt %, especially preferably 70 to 95 wt %, based on the total amount of the polyisocyanates present in the coating composition. A compound is termed a polyisocyanate when it contains on average more than one isocyanate group per molecule.

Further polyisocyanates which can be used are the compounds that are known per se, such as aliphatic and aromatic polyisocyanates, more particularly diisocyanates and their dimers and trimers such as uretdiones and isocyanurates. Examples that may be referenced include hexamethylene diisocyanate, octamethylene diisocyanate, decamethylene diisocyanate, dodecamethylene diisocyanate, tetradecamethylene diisocyanate, trimethylhexane diisocyanate, tetramethyl-hexane diisocyanate, isophorone diisocyanate (IPDI), 2-isocyanatopropylcyclohexyl isocyanate, dicyclohexylmethane 2,4'-diisocyanate, dicyclohexylmethane 4,4'-diisocyanate, 1,4- or 1,3-bis(isocyanato-methyl)cyclohexane, 1,4- or 1,3- or 1,2-diisocyanato-cyclohexane, and 2,4- or 2,6-diisocyanato-1-methyl-cyclohexane, diisocyanates or mixtures of these polyisocyanates. Preference here is given to using the dimers and/or trimers of the stated polyisocyanates that are known per se—in other words, thus, in particular, the uretdiones and isocyanurates of the abovementioned polyisocyanates, that are known per se and also available commercially. Preference is given to using aliphatic polyisocyanates. More particular preference is given to using no aromatic polyisocyanates. Preferred further polyisocyanates are hexamethylene diisocyanate and isophorone diisocyanate and also mixtures thereof, more particularly their trimers and dimers, such as isocyanurates and uretdiones, that are different from the isocyanurate (D). Such polyisocyanates are available commercially. Where present, the further polyisocyanates are used in the hardener component.

The coating composition of the invention may comprise a molecular sieve or a plurality of molecular sieves. Molecular sieve is the designation for natural or synthetic zeolites. As is known, they have a comparatively high internal surface area (about 600 to 700 $m^2/g$) and uniform pore diameters. The result of this is a relatively high adsorbency. The coating composition contains preferably 1 to 10 wt %, based on the total weight of the composition, of at least one molecular sieve. Suitable molecular sieves have a pore size of 2 to 10, preferably 3 to 4 angstroms. For example, high-porosity aluminum silicates with a pore size of 3 angstroms may be used.

The coating composition of the invention may comprise catalysts for the catalysis of the reaction of hydroxyl groups and amino groups with isocyanate groups. Based on the total weight of the composition, the coating composition comprises preferably 0.01 to 2 wt % of at least one catalyst. More preferably the coating composition of the invention comprises 0.02 to 1 wt %, based in each case on the total weight of the composition, of at least one catalyst. Suitable catalysts are the known metal catalysts such as, for example, tin, molybdenum, zirconium, or zinc catalysts, and also aminic catalysts such as 2-(2-dimethylaminoethoxy) ethanol, for example. Particularly suitable catalysts are tin compounds such as dimethyltin dilaurate or dibutyltin dilaurate, which, like all above-stated catalysts, catalyze a reaction between the HDI isocyanurates (D) and the hydroxyl- and amino-containing components (A) and (B), optionally also (C).

Lastly, the coating material compositions of the invention may also further comprise other constituents different from the components already described. These constituents include, for example, typical coatings additives such as antioxidants, deaerating agents, wetting agents, dispersants, flow control agents, and defoamers, as for example polysiloxane-based defoamers, adhesion promoters, as for example silane-based adhesion promoters, rheological assistants such as thickeners, antisag agents, and thixotropic agents, waxes and wax-like compounds, biocides, matting agents, radical scavengers, light stabilizers, preferably UV absorbers with an absorption maximum below 370 nm and/or sterically hindered amines (HALS), corrosion inhibitors, flame retardants, or polymerization inhibitors, and also soluble dyes, pigments, and further fillers or catalysts. The fraction of such constituents is within the ranges common for them, of 0.1 to 20 wt %, for example, based on the total amount of the coating composition.

The solids content of the coating compositions may vary according to the requirements of the case in hand, although it is especially advantageous that the composition can be prepared in solvent-free and water-free form and can nevertheless be applied in the manner described below. Preferably, therefore, the solids content of the coating composition of the invention is greater than 80%, more preferably greater than 85%, and very preferably 90 to 98 wt %.

By solids content (nonvolatile fraction) is meant that weight fraction which is left as a residue on evaporation under specified conditions. In the present application, the solids are determined according to DIN EN ISO 3251. This is done by evaporating the composition at 130° C. for 60 minutes.

Unless otherwise indicated, this test method may likewise be employed in order to specify or obtain a preliminary determination of, for example, the fraction of various components or constituents of the coating composition, such as a polycarbonate diol, for example, as a proportion of the total weight of the composition. It is possible, therefore, to determine the solids of a dispersion of a component that is to be added to the composition. By taking account of the solids of the dispersion and the amount of the dispersion used in the composition, it is then possible to determine or specify the fraction of the component as a proportion of the overall composition. This determination method may of course also take place if, for example, a constituent has been acquired commercially and is identified by the seller as being solvent-free or water-free. In this case, the solids of the commercial product for use will amount, for example, to approximately 100%.

In one preferred embodiment, the coating composition of the invention comprises
(1) in the paint base component
  (A) 5 to 30 wt % of at least one polycarbonate diol,
  (B) 5 to 30 wt % of at least one polyaspartic ester, and
  (C) 5 to 25 wt % of at least one filler modified with at least one organosilane,
and also
(2) in the hardener component
  (D) 20 to 60 wt % of at least one hexamethylene diisocyanate isocyanurate containing aliphatic polyester groups and having an isocyanate content of 5% to 23%, the weight figures being based in each case on the total weight of the coating composition.

Within this preferred embodiment, of course, all variants that are advantageous and have been described earlier on above, in terms of the components (A) to (D), for example, may likewise be considered to be advantageous. This applies in respect of the combination of the preferred embodiment with only one or else two or more of the above-described advantageous variants.

The ratio of the total molar amount of hydroxyl groups and amino groups in the paint base component to the molar amount of isocyanate groups in the hardener component is preferably from 1.0/0.9 to 1.0/1.5. With particular preference, accordingly, the ratio of the total molar amount of hydroxyl groups in component (A) and amino groups in component (B) of the paint base component to the molar amount of isocyanate groups in the hardener component occupies the stated value.

Of the stated constituents (A), (B), (C), and (D) there is preferably precisely one of each constituent present in the coating composition.

All stated preferred embodiments are taken per se and may be considered as preferred in combination with all other preferred configurations. The preferred embodiments apply not only for the coating composition of the invention, but also for the subject matter described subsequently, as for example a process in which the coating composition is employed.

The present invention also relates to a method for producing the coating composition of the invention. It can be produced using the customary and known mixing methods and mixing assemblies such as stirred tanks, agitator mills, extruders, or compounders. In this context it should be borne in mind that the coating composition of the invention is a two-component composition and that the paint base component and the hardener component are prepared and stored separately from one another and then not combined and mixed until shortly before the application of the primer, as described above. Besides the constituents (A), (B), and (C) that are essential to the invention, this paint base component generally comprises any adjuvants and/or coatings additives that may be present. This paint base component is then admixed with the hardener component, which in addition to the constituent (D) that is essential to the invention may also comprise further polyisocyanates, shortly before the coating composition is applied to a substrate.

A further subject of the present invention relates to a coating produced from the coating composition of the invention, and also to a method for producing such coatings.

The method for producing a coating comprises the application of the coating composition to a substrate. Application may take place by the customary methods such as spraying (for example, airless, air mix, compressed air, hot spray methods or inductive mixing), roller coating, rolling, brushing, or by cartridge. The coating composition is preferably applied by rolling or brushing.

In order to produce a cured coating, the applied coating composition is cured following application. Curing preferably takes place thermally. In this case the applied coating composition or the coating consisting of the composition is exposed preferably to temperatures of not more than 80° C., preferably not more than 60° C. Particularly preferred is a temperature range from 15 to 60° C., very particularly from 15 to 50° C.

The period of time needed for complete curing may vary greatly according to the curing temperature selected, and is situated, for example, in the range from 30 minutes to 10 days. Curing may take place, for example, for a time of 30 minutes at 40° C. to 60° C., or else at only 15 to 25° C. for a time of 7 days.

In the course of or prior to the curing, it is also possible to employ customary thermal curing devices and/or convection methods, examples being tunnel ovens, IR and NIR heat radiators, fans, and blowing tunnels. These devices may also be combined with one another. In that case, a temperature-controlled curing procedure may be assisted by convection.

A particular advantage is that, even in the as yet not fully cured state, the coatings have an erosion resistance that is already very good. This is especially advantageous in the context of the repair of coatings which have defects, as described later on below. Where, for example, coatings on rotor blades of permanently installed wind turbines are to be repaired, it is also possible for the turbine to be taken back into operation after just a short time, without curing at elevated temperatures, which would be extremely complex from a technical standpoint in this situation. Where, for example, a particular system generally requires 7 days in order to cure fully at 15 to 25° C., the erosion resistance achieved at these temperatures after only about 12 hours is already sufficient to allow the turbine to be taken back into operation.

The coatings may in each case have a dry film thickness of, for example, 100 to 500 μm, preferably from 150 to 400 μm.

The coatings of the invention can be produced on any desired substrates by application to the substrate of a coating composition of the invention. The substrates may be composed of any of a very wide variety of materials and combinations of materials. They consist preferably of metals such as steel or aluminum and also of plastics such as epoxy resin-based plastics, which may have been given glass fiber (GRP), aramid fiber (ARP) and/or carbon fiber (CRP) reinforcement or a natural fiber reinforcement with hemp or sisal, for example, and/or of glass. Preferred substrates are glass fiber-reinforced epoxy resin plastics. The substrates may have any desired shapes and sizes.

An advantage, however, is that very large substrates in particular, such as rotor blades, for example, can be coated without particular technical difficulties. The reason is that the coating composition of the invention can be cured at room temperature (i.e., 15 to 25° C.), meaning that there is no need for explicit supply of heat, in other words thermal energy, as part of a complex equipment set-up, in order to produce a cured coating. Ultimately, therefore, from a coating produced initially by the application of the coating composition, a cured coating is obtained by simple storage at room temperature.

On account of the very good erosion resistance of the coatings, preferred substrates are those which are particularly subject to rain or sand erosion. Substrates contemplated may be rotor blades, air or land vehicles, ships, edifices, or pipelines. Preferred substrates are rotor blades of wind turbines, helicopters, or ship's screws, and also air vehicles such as airplanes, for example. Suitable substrates more particularly are rotor blades of wind turbines and airplanes.

It follows from the above that a substrate coated with a coating of the invention is also provided by the present invention. It follows equally from the above that the use of the coating composition of the invention and also the use of a coating of the invention for improving the erosion resistance of substrates, more particularly of the substrates specified above, are also provided by the present invention.

It is also possible for a multicoat coating to be produced using a coating composition of the invention. A multicoat coating of this kind is also provided by the present invention. The coating produced from the coating composition is therefore present in a multicoat coating. Preferred multicoat coatings are those in which a coating of the invention constitutes the topcoat. In this way, one technical effect of the coating of the invention, namely the outstanding erosion resistance, is exploited to its optimum. This means that all of the further coating layers are disposed beneath the coating of the invention, and hence between the substrate and the coating of the invention. A substrate coated with a coating of the invention need not, therefore, be in direct contact with this coating. Disposed in between there may be further coats, an example being at least one surfacer coat known per se.

The coating composition of the invention is especially suitable for the coating of corners and edges, more particularly edges, of substrates. The use of the coating composition of the invention and also the use of a coating of the invention for improving edge protection is therefore also provided by the present invention. Straight edges of substrates, as for example of the substrates identified above, are particularly severely subject to erosive effects in service.

A particular advantage is the very good sandability of the coatings of the invention; in particular, good sandability is united with high erosion resistance. As stated at the outset, only effective sandability ensures that, as part of the pre-treatment of a coated surface to be repaired, this surface can be made ready appropriately for the repair, in order for it to be conditioned as an effective adhesion base, for example.

Accordingly, the present invention also provides a process for repairing coatings of the invention which are located on a substrate and possess defect sites. Equally, therefore, the present invention provides a process for repairing defects in multicoat coatings which are disposed on a substrate and comprise as topcoat a coating of the invention.

Defects develop over time as a result of the massive exposure of coatings to erosive effects. Although the coatings of the invention have a significantly improved erosion resistance, the need for repair will arise over time. In other words, in an original coating, certain defect sites will be formed and will require repair. For the repair, the defect sites must generally be subjected to a sanding treatment. In the course of this treatment, as is known, remaining remnants of coating are removed from the defect site, and the transitions between the defect site and intact coating may also be sanded. Depending on whether the defect site is limited only to the topcoat or else embraces lower-lying coatings (a surfacer coat, for example), it is also possible for further compositions to be applied—a surfacer, for example—as part of the repair, prior to the application of a coating composition of the invention.

The process for repairing coatings of the invention disposed on a substrate and possessing defect sites therefore comprises the sanding treatment of the defect sites and the subsequent application of a coating composition of the invention to the sanded defect site. Subsequently, of course, the repair coating will generally be cured as described above.

The present invention is elucidated below by examples.

EXAMPLES

1. Test Methods
1.1 General Remarks

For the laboratory determination of erosion resistance it is in general possible to use a variety of equipment, with which either the coated substrate for erosion is moved through the erosion medium, or the substrate is fixed and the erosion medium flows around it. A stationary test specimen can be tested, for example, by a high-pressure water jet technique, which is used for water jet cutting, for example. The erosion effect is controlled by water pressure, by distance from the workpiece, and by the type and size of nozzles. The effect can be intensified further by the use of sand, corundum or silicon carbide at the same time. Also conceivable is sandblasting or steam blasting, in which case the prevailing pressure, nozzle size, and distance from the workpiece may likewise be used to vary the erosion effect and adapt it to realistic conditions.

In the case of the rain erosion test for moving test specimens, the coated substrate for erosion is attached to a rotor or a disk and is moved, by means of the radial velocity generated, through a curtain of water droplets or mixtures with salt or sand. Currently the most common test scenario, which is used in the wind energy sector, for example, operates with velocities of 140 m/s and a rain volume of 30 l/h. In the airplane industry, velocities of up to 220 m/s are tested, with a comparable rain volume. The tests for rain erosion resistance may take place in accordance with the standard specification ASTM G 73. The constructions covered by this specification are individual and can be compared with one another using standards.

Common to the stated testing possibilities is the simulation of realistic velocities, such as peripheral velocities of rotor blades or travel flight velocities of airplanes, with the damage patterns being similar to the damage patterns that occur realistically.

The Shore hardness is tested by the impressing of a specified impression element into the material under test. Shore hardness may be tested according to DIN EN ISO 868. Two different Shore durometers (type A and type D) may be used. The higher the measured value (values of 0 to 100) within one scale level (A, D), the less the extent to which the tip of the impression element can be pressed into the material under test (the coating surface). A high value, accordingly, corresponds to a higher hardness on the part of the material.

While scales A and D are not directly comparable with one another, a fundamental principle is that the D scale is valid for harder materials. Accordingly, the stated DIN standard specification advises carrying out measurements with the type D durometer when values of more than 90 are obtained with the type A durometer, and advises performing measurements with the type A durometer if values of less than 20 are obtained with the type D durometer.

From the prior art it is known that flexible to tough and elastic coatings, which are therefore highly erosion-resistant on account of a hardness which is not too high, have a Shore hardness of A 50 to A 90 (WO 2012/032113 A1).

1.2 Test Conditions

As part of the examples, the rain erosion resistance was tested in accordance with the standard specification ASTM G 73. The tests were carried out on an in-house rain erosion test set-up. The test specimens are spun at defined time intervals (15 minutes) and at defined velocity (140 m/s) through a curtain of droplets. The flow rate applied keeps the rain volume likewise constant (30 l/h). The droplet sizes of the applied "rain" are on average 5-6 mm. The tests take place at a temperature of 20 to 25° C. Evaluation is visual. The erosion resistance corresponds to the time taken for the substrate to first show through.

The Shore hardness is determined in accordance with DIN EN ISO 868.

2. Production of Coating Compositions and Cured Coatings

The paint based component and hardener component of a coating composition were prepared by combining the respective constituents and intimately mixing them in a dissolver (table 1).

TABLE 1

| Constituent | Parts by weight |
|---|---|
| Paint base component | |
| Linear, aliphatic polycarbonate diol (A) having terminal hydroxyl groups | 30.0 |
| Molecular sieve | 4.0 |
| Polyaspartic ester (B) | 30.0 |
| Organosilane-modified wollastonite (C) | 23.75 |
| Color pigment | 7.8 |
| Additive mixture | 4.40 |
| Catalyst mixture | 0.05 |
| Total | 100 |
| Hardener component | |
| (HDI) isocyanurate (D) containing aliphatic polyester groups, with an NCO content of 11.0 | 89.5 |
| Mixture of HDI- and IPDI-based polyisocyanates | 10.5 |
| Total | 100 |

100 parts of the paint base component were then mixed homogeneously with 81 parts of the hardener component and this mixture was applied directly (brush application) to an epoxy resin test specimen already coated with a commercial, polyurea-based pore filler. Curing took place by storage over a period of 7 days at 20 to 25° C. The dry film thickness was 300 micrometers.

As a comparative composition and comparative multicoat coating, example 2 of WO 2012/032113 was recruited.

The multicoat coatings disposed on the substrate were subsequently investigated for rain erosion resistance and Shore hardness (table 2).

TABLE 2

| | Inventive | Comparative |
|---|---|---|
| Rain erosion test duration | 600 minutes | 160 minutes |
| Shore hardness | D25 | A65 |

It is evident that the multicoat coatings disposed on the substrate and comprising as their topcoat a coating of the invention exhibit a significantly improved erosion resistance. At the same time it has been found, surprisingly, that this coating is nevertheless comparatively hard and does not have the typical flexible to tough and elastic character of erosion-resistant coatings. The greater hardness is also accompanied by the anticipated improved sandability. While the coating of the invention can be sanded very effectively, this is not the case for the comparative coating. In the course of the sanding operation, the latter coating, which is fairly soft, is displaced in an uncontrolled way over the substrate, and an appropriately prepared base for the application of further coating materials for repair cannot be produced.

The invention claimed is:
1. A two-component coating composition, comprising:
   (1) a paint base component comprising
      (A) at least one polycarbonate diol,
      (B) at least one polyaspartic ester, and
      (C) at least one filler modified with at least one organosilane; and

(2) a hardener component comprising
(D) at least one hexamethylene diisocyanate isocyanurate containing aliphatic polyester groups and having an isocyanate content of 5% to 23%.

2. The two-component coating composition as claimed in claim 1, wherein said at least one polycarbonate diol (A) has an OH number of 50 to 500 mg KOH/g.

3. The two-component coating composition as claimed in claim 1, wherein said at least one polycarbonate diol (A) is an aliphatic and linear polycarbonate diol.

4. The two-component coating composition as claimed in claim 1, wherein said at least one polyaspartic ester (B) has an amine number of 120 to 300 mg KOH/g.

5. The two-component coating composition as claimed in claim 1, wherein said at least one polyaspartic ester (B) is aliphatic.

6. The two-component coating composition as claimed in claim 1, wherein said at least one filler (C) is a silicate modified with the at least one organosilane.

7. The two-component coating composition as claimed in claim 1, wherein said at least one filler (C) modified with at least one organosilane is preparable by modification of an inorganic filler with organosilanes of the formula (V)

$$X_{4-n-m}Si-R_n(-A-B)_m \quad (V)$$

where
X = OH, halogen, or alkoxy;
R = alkyl;
A = divalent organic radical;
B = amino, hydroxyl, epoxy, epoxypropyloxy, hydroxyalkyl, acetoxy, isocyanate, acryloyloxy, methacryloyloxy, imidazole, ureido, or a vinyl group; and
n, m = 0, 1, 2, or 3, with n+m≤3.

8. The two-component coating composition as claimed in claim 1, wherein the at least one hexamethylene diisocyanate isocyanurate containing aliphatic polyester groups is present, based on the total amount of polyisocyanates present in the coating composition, in a fraction of at least 50 wt %.

9. A method for producing a coating on a substrate, the method comprising application of a coating composition of claim 1 to a substrate.

10. The method as claimed in claim 9, wherein the coating produced by application is cured at a temperature of not more than 80° C.

11. The method as claimed in claim 9, wherein the substrate is a metal substrate or a plastic substrate.

12. A coating producible by a method of claim 9.

13. A multicoat coating, comprising as topcoat a coating as claimed in claim 12.

14. A substrate coated with a coating as claimed in claim 12.

15. A process for improving the erosion resistance of a substrate, the process comprising coating the substrate with the two-component coating composition of claim 1 to obtain a coated substrate having improved erosion resistance compared to the substrate.

* * * * *

UNITED STATES PATENT AND TRADEMARK OFFICE
CERTIFICATE OF CORRECTION

PATENT NO. : 10,370,559 B2
APPLICATION NO. : 15/118328
DATED : August 6, 2019
INVENTOR(S) : Dieter Hohnholz et al.

Page 1 of 1

It is certified that error appears in the above-identified patent and that said Letters Patent is hereby corrected as shown below:

On the Title Page

Column 2, item (56), under OTHER PUBLICATIONS, Line 1, "Wacher" should read --Wacker--.

Signed and Sealed this
Fourteenth Day of April, 2020

Andrei Iancu
*Director of the United States Patent and Trademark Office*